US012719601B2

(12) United States Patent
Kim et al.

(10) Patent No.: US 12,719,601 B2
(45) Date of Patent: Aug. 25, 2026

(54) LINE CONCENTRATOR OPTICAL COMMUNICATION APPARATUS AND CONTROL METHOD

(71) Applicant: NTT, Inc., Tokyo (JP)

(72) Inventors: Sang-Yuep Kim, Musashino (JP); Junichi Kani, Musashino (JP)

(73) Assignee: NTT, Inc., Tokyo (JP)

( * ) Notice: Subject to any disclaimer, the term of this patent is extended or adjusted under 35 U.S.C. 154(b) by 257 days.

(21) Appl. No.: 18/684,246

(22) PCT Filed: Sep. 10, 2021

(86) PCT No.: PCT/JP2021/033276
§ 371 (c)(1),
(2) Date: Feb. 16, 2024

(87) PCT Pub. No.: WO2023/037489
PCT Pub. Date: Mar. 16, 2023

(65) Prior Publication Data

US 2024/0356668 A1 Oct. 24, 2024

(51) Int. Cl.
*H04J 14/02* (2006.01)
*H04B 10/11* (2013.01)
*H04B 10/272* (2013.01)

(52) U.S. Cl.
CPC ........ *H04J 14/02762* (2023.08); *H04B 10/11* (2013.01); *H04B 10/272* (2013.01)

(58) Field of Classification Search
CPC ........ H04B 10/11; H04B 10/272; H04B 3/54; H04B 3/02; H04B 1/707; H04B 1/7163;
(Continued)

(56) References Cited

U.S. PATENT DOCUMENTS 6,650,451 B1 11/2003 Byers et al.
9,405,062 B2 * 8/2016 Krabshuis ............ G02B 6/0288
(Continued)

FOREIGN PATENT DOCUMENTS

JP 2000-224112 A 8/2000
JP 2010166279 A * 7/2010 ........... H04B 10/272

OTHER PUBLICATIONS

M. Jafar et al. , "Evaluation of coverage area for a wide line-of-sight indoor optical free-space communication system employing coherent detection," Apr. 27, 2007, Optical Wireless Communications, IET Commun., 2008, 2, (1), pp. 18-25.).*
(Continued)

*Primary Examiner* — Omar S Ismail
(74) *Attorney, Agent, or Firm* — Harness, Dickey & Pierce, P.L.C.

(57) ABSTRACT

A line concentration optical communication device that communicates with a plurality of optical communication devices by free-space optical communication includes: an optical device control unit that controls an angle of a spatial optical device in each time slot on the basis of angle information and the time slot, the angle information being information indicating an angle at which each of the optical communication devices and the spatial optical device whose angle is controllable can communicate with each other, the time slot indicating a communicable time allocated to each of the optical communication devices; and an optical communication unit that performs communication with each of the optical communication devices via the spatial optical device.

6 Claims, 3 Drawing Sheets

(58) Field of Classification Search

CPC . H04B 1/713; H04B 1/62; H04B 1/64; H04B 1/69; H04B 1/38; H04B 1/3816; H04B 1/3827; H04B 1/40; H04B 1/3818; H04B 1/403; H04B 1/44; H04B 1/50; H04B 1/54; H04B 1/03; H04B 1/02; H04B 1/10; H04B 1/16; H04B 1/06; H04B 5/20; H04B 5/40; H04B 5/70; H04B 7/02; H04B 7/14; H04B 7/24; H04B 10/07; H04B 10/03; H04B 10/25; H04B 10/27; H04B 10/29; H04B 10/40; H04B 10/50; H04B 10/60; H04B 10/80; H04B 10/70; H04B 13/02; H04B 14/02; H04B 15/02; H04B 17/10; H04B 17/20; H04B 17/30; H04J 14/02; H04J 1/02; H04J 3/02; H04J 3/24; H04J 7/02; H04J 13/10; H04J 13/16; H04J 14/08; H04J 3/26; H04J 3/06; H04J 1/04; H04J 1/00; H04J 3/04; H04J 1/16

See application file for complete search history.

(56) References Cited

U.S. PATENT DOCUMENTS 10,374,710 B2* 8/2019 Ashrafi .............. H04B 10/5161
10,491,303 B2* 11/2019 Ashrafi .............. H01Q 21/0025
11,088,755 B2* 8/2021 Ashrafi .............. H04B 7/15507
2002/0164114 A1* 11/2002 Golub .................... G02B 6/356 356/330
2003/0011850 A1* 1/2003 Sidorovich ............ G02B 27/48 398/126
2003/0016539 A1* 1/2003 Minano .............. G02B 19/0061 362/348
2003/0035182 A1* 2/2003 Sidorovich ........ H04B 10/1149 398/126
2008/0142078 A1* 6/2008 Johnson .................. F24S 23/71 359/853
2009/0097862 A1* 4/2009 Munro ................... B82Y 10/00 398/175
2009/0116839 A1* 5/2009 Kikuchi .............. H04J 14/0307 398/79
2010/0139765 A1* 6/2010 Mapel ..................... H10F 77/45 136/257
2010/0226134 A1* 9/2010 Capasso ................ H01S 5/1082 438/42
2010/0266280 A1* 10/2010 Yamashita ........ H04J 14/02764 398/58
2010/0272436 A1* 10/2010 Mizutani ............ H04Q 11/0067 398/25
2011/0247691 A1* 10/2011 Yu .......................... H10F 77/45 977/932
2012/0031467 A1* 2/2012 Schmaelzle .............. F24S 23/11 126/684
2013/0201031 A1* 8/2013 Yang ........................ H04Q 9/00 340/870.02
2013/0301481 A1* 11/2013 Inoue ...................... H04L 65/80 370/259
2014/0219608 A1* 8/2014 Sorin ................... G02B 6/2817 385/48
2015/0014145 A1* 1/2015 Wakita ..................... B01D 1/00 203/1
2015/0234218 A1* 8/2015 Aoyama .............. H04B 10/116 349/33
2015/0292699 A1* 10/2015 Wölfing .................. F21S 41/19 362/510
2015/0323752 A1* 11/2015 Gaber .................. G02B 6/3877 385/60
2015/0374276 A1* 12/2015 Farkas ................... A61B 5/443 600/407
2015/0374309 A1* 12/2015 Farkas ............... A61B 5/14558 600/407
2016/0009066 A1* 1/2016 Nieber ................... B23K 26/53 156/272.8
2016/0056756 A1* 2/2016 Alsadah ................ H10F 77/492 136/259
2016/0162767 A1* 6/2016 Ito .................... G06K 19/06046 235/494
2017/0018215 A1* 1/2017 Black ................. G02B 26/0883
2017/0058244 A1* 3/2017 Labarge ................ B01F 21/221
2017/0059151 A1* 3/2017 Black .................. G02B 6/0055
2017/0061905 A1* 3/2017 Lin ........................ H05B 45/60
2017/0082268 A1* 3/2017 Gordon ............. G02B 19/0014
2017/0353242 A1* 12/2017 Mansouri Rad . H04B 10/25891
2018/0192328 A1* 7/2018 Uzawa ................ H04J 14/0246
2018/0262272 A1* 9/2018 Ashrafi ............. H04B 10/2575
2018/0275410 A1* 9/2018 Yeoh .................. G02B 27/0172
2018/0277035 A1* 9/2018 Komanduri .............. G09G 3/32
2018/0278335 A1* 9/2018 Segura ................ H04J 14/0305
2018/0286323 A1* 10/2018 Goodman ............ G02B 5/0278
2018/0352626 A1* 12/2018 Komanduri .............. G09G 3/32
2019/0173582 A1* 6/2019 Ashrafi .................... H04B 7/15
2019/0222316 A1* 7/2019 Williams ................ H02M 5/06
2019/0229974 A1* 7/2019 Campos ................ H04L 1/0003
2019/0287495 A1* 9/2019 Mathur ................... G06F 3/011
2019/0353749 A1* 11/2019 Lam .......................... G01S 5/16
2019/0363843 A1* 11/2019 Gordaychik .......... H04L 1/1896
2020/0141908 A1* 5/2020 Bingham ............. G01N 29/265
2021/0112016 A1* 4/2021 Harada ................... H04L 47/28
2021/0226182 A1* 7/2021 Tung ................... H10P 72/0461
2021/0226183 A1* 7/2021 Tung .................... H10K 71/166
2021/0234592 A1* 7/2021 Ashrafi ............... H01Q 21/065
2024/0356668 A1* 10/2024 Kim ..................... H04B 10/272
2025/0321320 A1* 10/2025 Jeon ........................ G01S 7/021

OTHER PUBLICATIONS

Mojtaba Mansour Abadi et al.,"A space division multiplexed freespace-optical communication system that can auto-locate and fully self align with a remote," Dec. 23, 2019, Scientific Reports | (2019) 9:19687,pp. 1-5.*

Vincent W. S. Chan,"Free-Space Optical Communications," Aug. 17, 2006, Journal of Lightwave Technology, vol. 24, No. 12, Dec. 2006, pp. 4750-4760.*

Ahmed Taha Hussein,"10 Gbps Mobile Visible Light Communication System Employing Angle Diversity, Imaging Receivers, and Relay Nodes," Jul. 8, 2015,J. Opt. Commun. Netw./vol. 7, No. 8/Aug. 2015,pp. 718-733.*

Yagiz Kaymak<b> et al.,"On Divergence-Angle Efficiency of a Laser Beam in Free-Space Optical Communications for High-Speed Trains," Mar. 23, 2017, IEEE Transactions on Vehicular Technology, vol. 66, No. 9, Sep. 2017,pp. 7677-7684 .</b>.*

Dong-Yiel Song,"× 10 Gb/s terrestrial optical free space transmission over 1.2 km using an EDFA preamplifier with 100 GHz channel spacing," Oct. 4, 2000, Optics Express,Oct. 9, 2000 / vol. 7, No. 8,pp. 1-4.*

Abdelbaset S. Hamza et al., Classification Framework for Free Space Optical Communication Links and Systems, Oct. 18, 2018, IEEE Communications Surveys & Tutorials, vol. 21, No. 2, Second Quarter 2019,pp. 1346-1368.*

Zizheng Cao et al., Reconfigurable beam system for non-lineof-sight free-space optical communication,Light: Science & Applications ( 2019)8 :69, pp. 1-7.*

Dong-Yiel Song et al., "4×10 Gb/s terrestrial optical free space transmission over 1.2 km using an EDFA preamplifier with 100 GHz channel spacing," Oct. 4, 2000, Optics Express, vol. 7, No. 8,p. 280-281.*

Song D.-Y. et al., "4×10 GB/s terrestrial optical free space transmission over 1.2 km using an EDFA preamplifier with 100 GHz channel spacing", Optics Express vol. 7, No. 8, pp. 280-284, Oct. 2000.

* cited by examiner

LINE CONCENTRATOR OPTICAL COMMUNICATION APPARATUS AND CONTROL METHOD

CROSS-REFERENCE TO RELATED APPLICATIONS

This application is a 371 U.S. National Phase of International Application No. PCT/JP2021/033276, filed on Sep. 10, 2021. The entire disclosure of the above application is incorporated herein by reference.

TECHNICAL FIELD

The present invention relates to a line concentration optical communication device and a control method.

BACKGROUND ART

In a current free-space optical communication system, data communication between an optical transmitter and an optical receiver is performed in a point-to-point (P2P) topology. FIG. 4 illustrates a configuration of a conventional free-space optical communication system 100. The free-space optical communication system 100 includes one optical communication device 110 and one optical communication device 210. The optical communication device 110 and the optical communication device 210 perform wireless communication by using light. The optical communication device 110 includes a spatial optical device 111, a modulator 112, a light source 113, a photodetector 114, and a demodulator 115.

The spatial optical device 111 forms a transmission light beam by using, for example, light output from the light source 113. The spatial optical device 111 receives, for example, light transmitted from the optical communication device 210. The modulator 112 modulates data to be transmitted (hereinafter, referred to as "transmission data"). The light source 113 generates an optical signal by using the modulated transmission data. The photodetector 114 converts the optical signal received by the spatial optical device 111 into an electrical signal. The demodulator 115 demodulates the electrical signal converted by the photodetector 114.

The optical communication device 210 includes a spatial optical device 211, a modulator 212, a light source 213, a photodetector 214, and a demodulator 215. Each functional unit included in the optical communication device 210 performs processing similar to that of each function of the optical communication device 110, and thus description thereof is omitted. As described above, in the P2P communication indicated by the conventional free-space optical communication system 100, intensity modulation or demodulation is performed by binary values, i.e., on and off (on-off keying (OOK)), and the optical communication device 110 and the optical communication device 210 are always connected. Thus, data communication is performed by a continuous signal.

CITATION LIST

Non Patent Literature

Non Patent Literature 1: Dong-Yiel Song, Yoon-Suk Hurh, Jin-Woo Cho, Jung-Hwan Lim, Dong-Woo Lee, Jae-Seung Lee and Youngchul Chung, "4×10 Gb/s terrestrial optical free space transmission over 1.2 km using an EDFA preamplifier with 100 GHz channel spacing", Optics Express vol. 7, no. 8, pp. 280-284, October 2000.

SUMMARY OF INVENTION

Technical Problem

In a free-space optical communication system, connection with a point-to-multipoint (P2MP) topology may be performed to further improve communication efficiency. In the P2MP topology, there is an advantage that a large number of optical communication devices can be housed more economically by placing one line concentration optical device. Meanwhile, in order to implement free-space optical communication of the P2MP topology, it is necessary to connect a plurality of optical communication devices to one line concentration optical device. An optical splitter may be used to connect the plurality of optical communication devices to one line concentration optical device. However, the use of the optical splitter increases an optical loss. Therefore, a technique of performing communication in the P2MP topology without using the optical splitter has been desired to suppress the optical loss.

In view of the above circumstances, an object of the present invention is to provide a technique capable of performing communication in a point-to-multipoint topology without using an optical splitter in a free-space optical communication system.

Solution to Problem

One aspect of the present invention is a line concentration optical communication device that communicates with a plurality of optical communication devices by free-space optical communication, the line concentration optical communication device including: an optical device control unit that controls an angle of a spatial optical device in each time slot on the basis of angle information and the time slot, the angle information being information indicating an angle at which each of the optical communication devices and the spatial optical device whose angle is controllable can communicate with each other, the time slot indicating a communicable time allocated to each of the optical communication devices; and an optical communication unit that performs communication with each of the optical communication devices via the spatial optical device.

One aspect of the present invention is a control method performed by a line concentration optical communication device that communicates with a plurality of optical communication devices by free-space optical communication, the control method including: controlling an angle of a spatial optical device in each time slot on the basis of angle information and the time slot, the angle information being information indicating an angle at which each of the optical communication devices and the spatial optical device whose angle is controllable can communicate with each other, the time slot indicating a communicable time allocated to each of the optical communication devices; and performing communication with each of the optical communication devices via the spatial optical device.

Advantageous Effects of Invention

The present invention can perform communication in a point-to-multipoint topology without using an optical splitter in a free-space optical communication system.

DESCRIPTION OF EMBODIMENTS

Hereinafter, an embodiment of the present invention will be described with reference to drawings.

Figure 1:
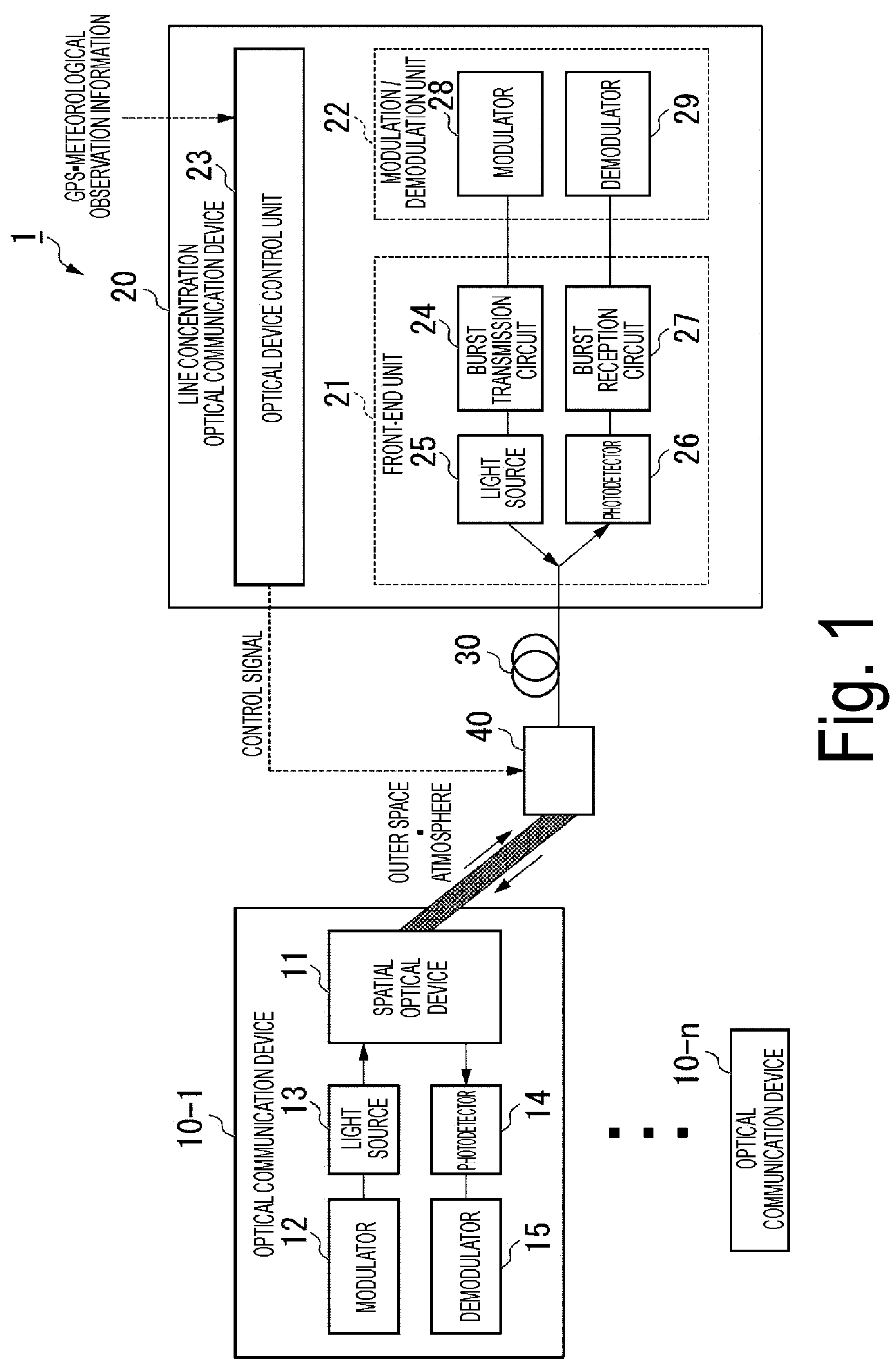
FIG. 1 illustrates a configuration of a free-space optical communication system according to the present invention.

FIG. 1 illustrates a configuration of a free-space optical communication system 1 according to the present invention. The free-space optical communication system 1 includes a plurality of optical communication devices 10-1 to **10-*n* (n is an integer of 2 or more) and one line concentration optical communication device 20. The line concentration optical communication device 20 is connected to a spatial optical device 40 via an optical fiber 30. Hereinafter, in a case where the optical communication devices 10-1 to 10-*n* are not particularly distinguished, the optical communication devices will be simply referred to as the optical communication devices 10**.

The spatial optical device 40 is an optical device that can control a radiation angle and acceptance angle of a light beam at a high speed and is, for example, a high-speed mechanical mirror actuator or an optical spatial light modulator (SLM). The line concentration optical communication device 20 controls the radiation angle and acceptance angle of the light beam at a high speed by using the spatial optical device 40, and thus the plurality of optical communication devices 10 are connected to the line concentration optical communication device 20. A transmission path of a free space is formed between the plurality of optical communication devices 10-1 to **10-*n* and the spatial optical device 40, thereby transmitting light beams. The line concentration optical communication device 20 in the present embodiment needs to control an angle of the spatial optical device 40 on the basis of a time slot. Thus, the spatial optical device 40** can desirably be an optical device that can operate at a high speed.

The optical communication device 10 communicates with the line concentration optical communication device 20. For example, the optical communication device 10 is a satellite located in outer space or an optical communication device installed on the ground.

The line concentration optical communication device 20 communicates with the plurality of optical communication devices 10-1 to **10-*n*. For example, the plurality of optical communication devices 10-1 to 10-*n* and the line concentration optical communication device 20 perform communication by time division multiplexing (TDM). The line concentration optical communication device 20 allocates time slots such that the optical communication devices 10 do not overlap each other, switches the radiation angle and acceptance angle of the spatial optical device 40 in accordance with the allocated time slot, and performs connection and data communication with each optical communication device 10**.

Next, functional units of the optical communication device 10 and the line concentration optical communication device 20 will be described. The functional units of the optical communication devices 10-1 to **10-*n* are the same and thus will be described without being particularly distinguished. The optical communication device 10 includes a spatial optical device 11, a modulator 12, a light source 13, a photodetector 14, and a demodulator 15**.

The spatial optical device 11 forms a transmission light beam by using, for example, light output from the light source 13. The spatial optical device 11 receives, for example, light transmitted from the spatial optical device 40. The spatial optical device 11 is, for example, an optical device that can control the radiation angle and acceptance angle of a light beam. For example, the spatial optical device 11 may be a mechanical mirror actuator or an optical SLM. The spatial optical device 11 is not limited to the above and may be the conventional spatial optical device 111. The spatial optical device 11 is provided to face in a direction of the spatial optical device 40. Meanwhile, the spatial optical device 40 performs switching control of the radiation angle and the acceptance angle under the control of the line concentration optical communication device 20. Therefore, in a case where directions of the radiation angle and acceptance angle of the spatial optical device 40 switched at a high speed match with directions of the radiation angle and acceptance angle of the spatial optical device 11, the optical communication device 10 can communicate with the line concentration optical communication device 20 via the spatial optical device 11 and the spatial optical device 40.

The modulator 12 modulates transmission data. The light source 13 generates an optical signal by using the modulated transmission data. The photodetector 14 converts the optical signal received by the spatial optical device 11 into an electrical signal. The photodetector 14 is, for example, a photodiode (PD). The demodulator 15 demodulates the electrical signal converted by the photodetector 14.

The line concentration optical communication device 20 includes a front-end unit 21 (optical communication unit), a modulation/demodulation unit 22, and an optical device control unit (optical device controllor) 23. The front-end unit 21 includes a burst transmission circuit 24, a light source 25, a photodetector 26, and a burst reception circuit 27. The burst transmission circuit 24 generates a burst signal. The light source 25 generates an optical signal by using the burst signal generated by the burst transmission circuit 24. The burst transmission circuit 24 and the light source 25 correspond to an optical transmission unit that transmits an optical signal.

The photodetector 26 converts an optical signal received by the optical fiber 30 into an electrical signal. The photodetector 26 is, for example, a PD. The burst reception circuit 27 compensates for a power difference between received burst frames caused by different spatial transmission paths from the optical communication devices 10 to the line concentration optical communication device 20. The photodetector 26 and the burst reception circuit 27 correspond to an optical reception unit that receives an optical signal.

The modulation/demodulation unit 22 includes a modulator 28 and a demodulator 29. The modulator 28 modulates transmission data. The demodulator 29 demodulates an electrical signal output from the burst reception circuit 27. The modulation/demodulation unit 22 may perform either intensity modulation direct detection or multi-level modulation coherent detection.

The optical device control unit 23 determines a time slot to be allocated to each optical communication device 10 on the basis of identification information of each optical communication device 10 and information regarding a time of arrival. Then, the optical device control unit 23 controls the radiation angle and acceptance angle of the spatial optical device 40 on the basis of information regarding the determined time slot and angle information.

The angle information indicates an angle for directing a light beam to each optical communication device 10. In a case where the direction of the spatial optical device 11 included in each optical communication device 10 does not match with the direction of the spatial optical device 40, communication cannot be performed. In order to communicate with each optical communication device 10, the angle information includes information indicating an angle for directing a light beam to the optical communication device 10 in association with the identification information of each optical communication device 10. The angle information is stored in advance in the line concentration optical communication device 20. The identification information of each optical communication device 10 is stored in advance in the line concentration optical communication device 20.

The time of arrival indicates a time of arrival of a burst frame generated by each optical communication device 10 to the line concentration optical communication device 20. The optical device control unit 23 estimates the time of arrival of each burst frame on the basis of distance information between each optical communication device 10 and the line concentration optical communication device 20 and refractive index information of the spatial transmission path. The distance information between each optical communication device 10 and the line concentration optical communication device 20 may be acquired by using position information obtained by a global positioning system (GPS). The optical device control unit 23 further acquires refractive index information of outer space or an atmosphere by using measurement information obtained from a meteorological observation device, a space satellite, or the like. The refractive index information indicates a refractive index generated in a space between each optical communication device 10 and the line concentration optical communication device 20. The refractive index information is different for each spatial communication path between each optical communication device 10 and the line concentration optical communication device 20.

Figure 2:
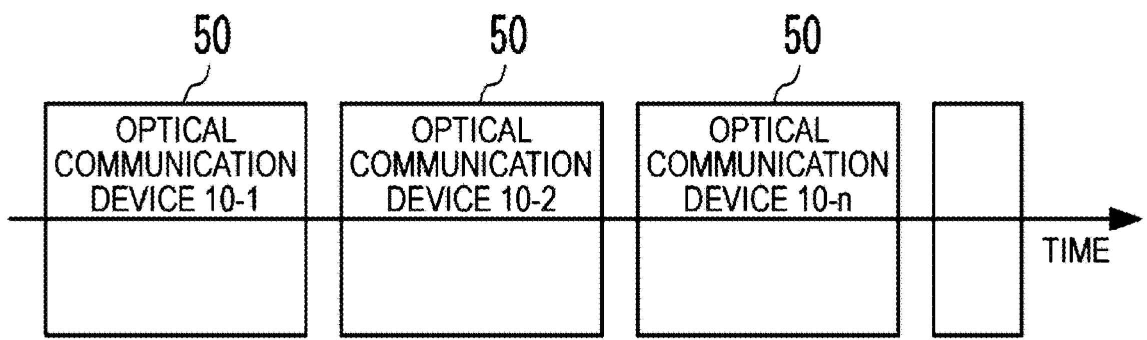
FIG. 2 illustrates an example of a burst frame transmitted and received between an optical communication device and a line concentration optical communication device according to an embodiment.

FIG. 2 illustrates an example of a burst frame transmitted and received between the optical communication device 10 and the line concentration optical communication device 20 according to the embodiment. Each frame 50 in FIG. 2 indicates a burst frame transmitted from each optical communication device 10 to the line concentration optical communication device 20 or a burst frame transmitted from the line concentration optical communication device 20 to each optical communication device 10.

Figure 3:
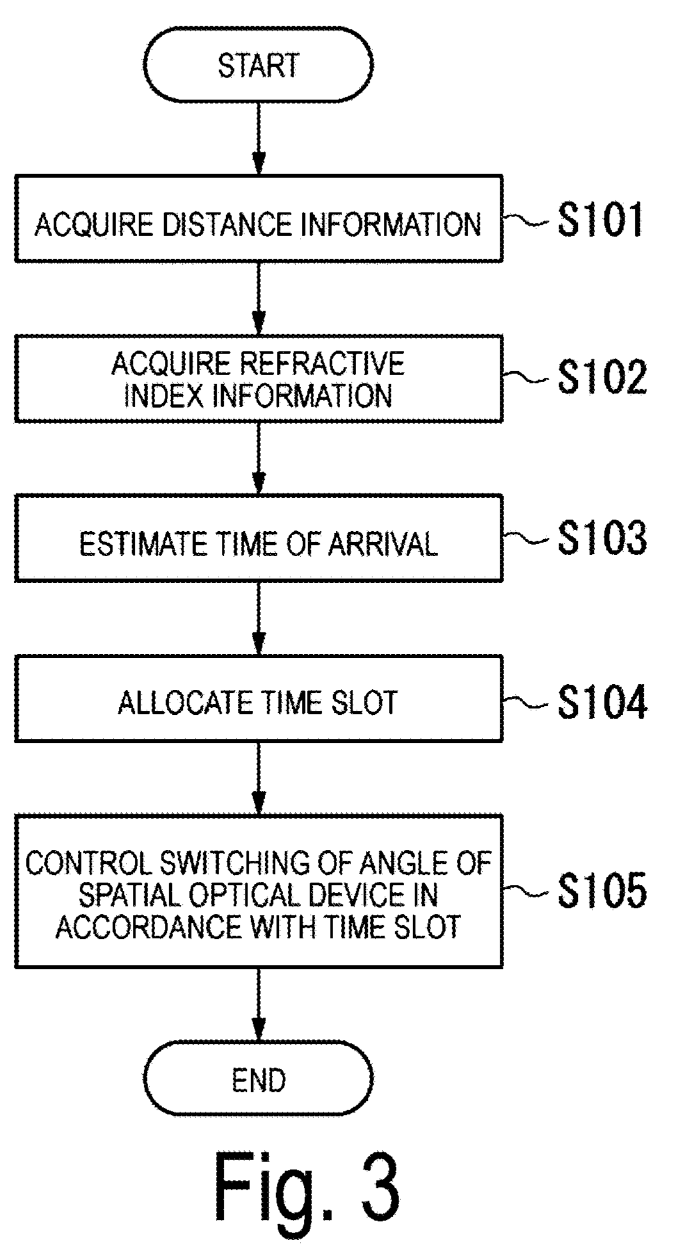
FIG. 3 is a flowchart showing a flow of processing of a line concentration optical communication device according to an embodiment.
Figure 4:
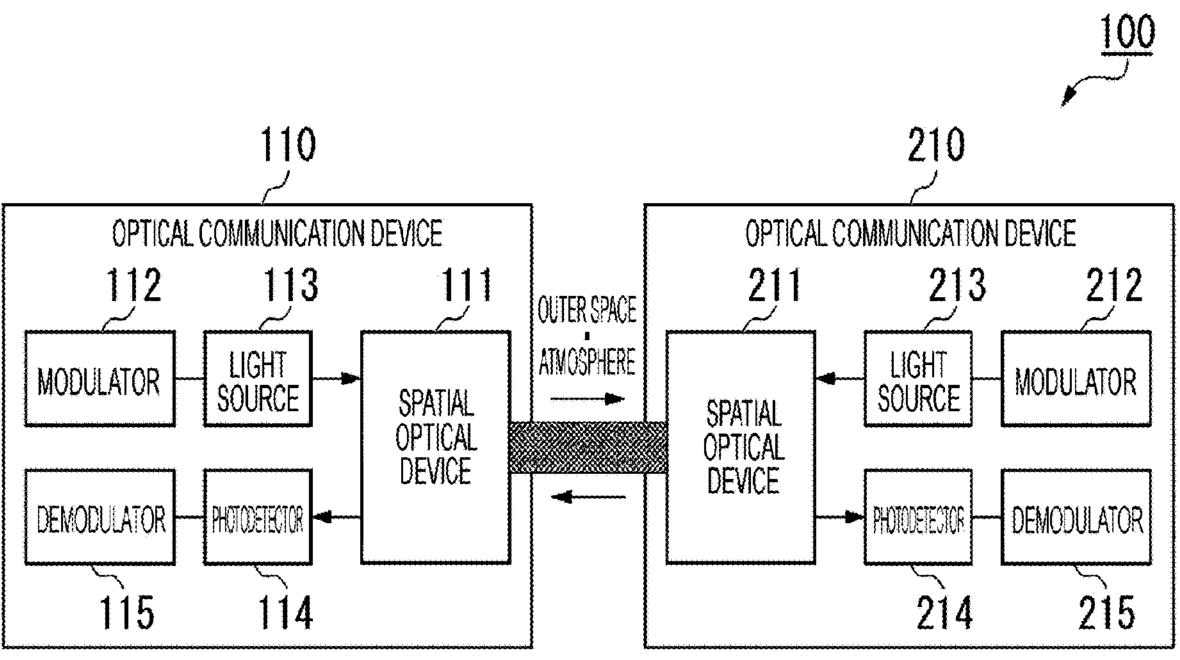
FIG. 4 illustrates a configuration of a conventional free-space optical communication system.

FIG. 3 is a flowchart showing a flow of processing of the line concentration optical communication device 20 according to the embodiment.

The optical device control unit 23 acquires distance information indicating a distance between each optical communication device 10 and the line concentration optical communication device 20 by using position information obtained by the GPS (step S101). Next, the optical device control unit 23 acquires refractive index information of outer space or an atmosphere by using measurement information obtained from a meteorological observation device, a space satellite, or the like (step S102).

The optical device control unit 23 estimates a time of arrival of a burst frame generated by each optical communication device 10 to the line concentration optical communication device 20 by using the acquired plurality of pieces of distance information and refractive index information (step S103). Specifically, the optical device control unit 23 estimates the time of arrival for each optical communication device 10 on the basis of the following Expression (1). Note that a refractive index indicated by the refractive index information is different for each spatial communication path between each optical communication device 10 and the line concentration optical communication device 20. Therefore, the optical device control unit 23 estimates the time of arrival of each optical communication device 10 by using the refractive index information of the spatial communication path between the optical communication device 10 for which the time of arrival is to be obtained and the line concentration optical communication device 20.

$$\text{Time of arrival} = (\text{distance} \cdot \text{refractive index})/\text{speed of light in vacuum} \quad \text{Expression (1)}$$

The optical device control unit 23 allocates time slots on the basis of the time of arrival estimated for each optical communication device 10 such that the optical communication devices 10 do not overlap each other (step S104). For example, the optical device control unit 23 may allocate time slots in ascending order of the time of arrival. The optical device control unit 23 notifies each optical communication device 10 of information regarding the time slot allocated to each optical communication device 10. Thereafter, the optical device control unit 23 controls switching of the angle of the spatial optical device 40 in accordance with the time slot (step S105).

Specifically, when a time corresponding to the time slot allocated to the optical communication device 10-1 comes, the optical device control unit 23 generates a control signal for controlling the angle of the spatial optical device 40 such that the spatial optical device 40 has an angle indicated by angle information corresponding to the optical communication device 10-1. The optical device control unit 23 outputs the generated control signal to the spatial optical device 40. The spatial optical device 40 changes the radiation angle and the acceptance angle to angles included in the control signal in response to the control signal. In this manner, the optical device control unit 23 generates a control signal including information for setting the angle of the spatial optical device 40 to a desired angle and outputs the generated control signal to the spatial optical device 40, thereby controlling the angle of the spatial optical device 40. This makes it possible to transmit and receive burst frames between the optical communication device 10-1 and the line concentration optical communication device 20.

For example, the line concentration optical communication device 20 transmits an optical signal that is a burst frame output from the front-end unit 21 to the optical communication device 10-1 via the spatial optical device 40. For example, the line concentration optical communication device 20 receives an optical signal that is a burst frame transmitted from the optical communication device 10-1 via the spatial optical device 40.

Thereafter, the optical device control unit 23 repeatedly performs the above control in accordance with the time slots, thereby performing control such that each optical communication device 10 and the line concentration optical communication device 20 can communicate with each other.

The free-space optical communication system 100 configured as described above can perform communication in the point-to-multipoint topology without using an optical splitter in the free-space optical communication system. Specifically, the line concentration optical communication device 20 includes: the optical device control unit 23 that controls the angle of the spatial optical device 40 in each time slot on the basis of the angle information and the time slot; and the front-end unit 21 that communicates with each optical communication device 10 via the spatial optical device 40. As described above, the line concentration optical communication device 20 connects to each optical communication device 10 by controlling the angle of the spatial optical device 40 in accordance with the time slot. Therefore, it is possible to perform communication in the point-to-multipoint topology in the free-space optical communication system without using an optical splitter.

The line concentration optical communication device 20 estimates a time of arrival of a signal transmitted from each optical communication device 10 on the basis of the distance information and the refractive index information and allocates a time slot in accordance with the time of arrival such that the optical communication devices 10 do not overlap each other. As described above, the line concentration optical communication device 20 estimates the time of arrival in consideration of the refractive index generated in a space between the line concentration optical communication device 20 and each optical communication device 10. This makes it possible to reduce an influence of the time of arrival depending on a weather condition and to implement communication in the point-to-multipoint topology.

Further, the line concentration optical communication device 20 generates a control signal including information for setting the angle of the spatial optical device 40 to a desired angle and outputs the generated control signal to the spatial optical device 40, thereby controlling the angle of the spatial optical device 40. This makes it possible to freely switch the angle of the spatial optical device 40 in accordance with the time slot.

Hereinafter, a modification example of the free-space optical communication system 100 will be described.

The spatial optical device 40 may be provided in the line concentration optical communication device 20.

Some functions (e.g. the optical device control unit 23) of the line concentration optical communication device 20 described above may be implemented by a computer. In that case, a program for implementing those functions may be recorded in a computer-readable recording medium, and the program recorded in the recording medium may be read and executed by a computer system to implement the functions. Note that the “computer system” mentioned herein includes an OS and hardware such as peripheral devices. The “computer-readable recording medium” refers to a portable medium such as a flexible disk, a magneto-optical disc, a ROM, or a CD-ROM or a storage device such as a hard disk included in the computer system.

The “computer-readable recording medium” may include a medium that dynamically stores the program for a short time, such as a communication line in a case where the program is transmitted via a network such as the Internet or a communication line such as a telephone line, and a medium that stores the program for a certain period of time, such as a volatile memory inside the computer system serving as a server or a client in that case. The above program may be for implementing some of the functions described above, may be implemented in a combination of the functions described above and a program already recorded in the computer system, or may be implemented by using a programmable logic device such as a field programmable gate array (FPGA).

Hereinabove, embodiments of the present invention have been described in detail with reference to the drawings. However, specific configurations are not limited to the embodiments and include designs and the like without departing from the gist of the present invention.

INDUSTRIAL APPLICABILITY

The present invention is applicable to a free-space optical communication system technique that performs point-to-multipoint communication.

REFERENCE SIGNS LIST

10-1 to **10-*n*** Optical communication device
11 Spatial optical device
12 Modulator
13 Light source
14 Photodetector
15 Demodulator
20 Line concentration optical communication device
21 Front-end unit
22 Modulation/demodulation unit
23 Optical device control unit
24 Burst transmission circuit
25 Light source
26 Photodetector
27 Burst reception circuit
28 Modulator
29 Demodulator
30 Optical fiber
40 Spatial optical device

The invention claimed is:

1. A line concentration optical communication device that communicates with a plurality of optical communication devices by free-space optical communication, the line concentration optical communication device comprising:

an optical device controllor configured to control an angle of a spatial optical device in each time slot on the basis of angle information and the time slot, the angle information being information indicating an angle at which each of the optical communication devices and the spatial optical device whose angle is controllable can communicate with each other, the time slot indicating a communicable time allocated to each of the optical communication devices; and an optical communicator configured to perform communication with each of the optical communication devices via the spatial optical device, wherein the optical device controllor estimates a time of arrival of a signal transmitted from each of the optical communication devices on the basis of distance information between the line concentration optical communication device and each of the optical communication devices and refractive index information indicating a refractive index generated in a space between the line concentration optical communication device and each of the optical communication devices and allocates the time slot in accordance with the time of arrival such that the optical communication devices do not overlap each other.

2. The line concentration optical communication device according to claim 1, wherein the optical device controllor controls the angle of the spatial optical device by generating a control signal including information for setting the angle of the spatial optical device to a desired angle and outputting the generated control signal to the spatial optical device.

3. The line concentration optical communication device according to claim 1, wherein the optical communicator performs communication with each of the optical communication devices by using a burst frame.

4. A control method performed by a line concentration optical communication device that communicates with a plurality of optical communication devices by free-space optical communication, the control method comprising:

controlling an angle of a spatial optical device in each time slot on the basis of angle information and the time slot, the angle information being information indicating an angle at which each of the optical communication devices and the spatial optical device whose angle is controllable can communicate with each other, the time slot indicating a communicable time allocated to each of the optical communication devices;

performing communication with each of the optical communication devices via the spatial optical device;

estimating a time of arrival of a signal transmitted from each of the optical communication devices on the basis of distance information between the line concentration optical communication device and each of the optical communication devices and refractive index information indicating a refractive index generated in a space between the line concentration optical communication device and each of the optical communication devices; and allocating the time slot in accordance with the time of arrival such that the optical communication devices do not overlap each other.

5. A control method performed by a line concentration optical communication device that communicates with a plurality of optical communication devices by free-space optical communication, the control method comprising:

controlling an angle of a spatial optical device in each time slot on the basis of angle information and the time slot, the angle information being information indicating an angle at which each of the optical communication devices and the spatial optical device whose angle is controllable can communicate with each other, the time slot indicating a communicable time allocated to each of the optical communication devices;

performing communication with each of the optical communication devices via the spatial optical device; and controlling the angle of the spatial optical device by generating a control signal including information for setting the angle of the spatial optical device to a desired angle and outputting the generated control signal to the spatial optical device.

6. The line concentration optical communication device according to claim 2, wherein the optical communicator performs communication with each of the optical communication devices by using a burst frame.

* * * * *